United States Patent Office 3,510,491
Patented May 5, 1970

3,510,491
4-(CYCLICAMINOMETHYL)-5-HYDROXYINDOLE-3-CARBOXYLIC ACIDS AND ESTERS THEREOF
Malcolm R. Bell, East Greenbush, N.Y., assignor to Sterling Drug Inc., New York, N.Y., a corporation of Delaware
No Drawing. Filed Feb. 2, 1967, Ser. No. 613,456
Int. Cl. C07d 27/56
U.S. Cl. 260—268         16 Claims

ABSTRACT OF THE DISCLOSURE

Certain 4 - (cyclic aminomethyl) - 5 - hydroxyindole-3-carboxylic acids and esters thereof, having hypoglycemic and psychomotor depressant activity, are prepared by the reaction of the appropriate 5-hydroxyindole-3-carboxylic acid or ester with a secondary amine and formaldehyde.

This invention relates to new indole derivatives and in particular is concerned with 3-carboxy-4-methyl-5-hydroxyindoles having attached to the 4-methyl group selected substituted cyclic amino groups, with esters thereof, and with the preparation thereof.

The compounds of the invention are of the formula

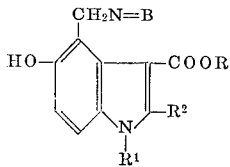

I wherein N=B is 4-hydroxy-1-piperidyl, 4-oxo-1-piperidyl, 3 - hydroxy - 8 - nortropanyl, or 4 - lower - alkyl - 1-piperazinyl; R and $R^1$ are hydrogen, lower-alkyl or phenyl-lower-alkyl; and $R^2$ is hydrogen or lower-alkyl.

In the foregoing definitions the term "lower-alkyl" refers to alkyl groups having from one to about six carbon atoms, thus including, for example, methyl, ethyl, propyl, isopropyl, butyl, pentyl, hexyl, and the like.

The compounds of Formula I above are prepared by reacting a compound of the formula

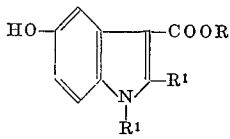

II with formaldehyde and a secondary amine of the formula HN=B. The reaction takes place readily at temperatures between about 50° and 150° C. in the inert solvent. A preferred solvent is aqueous acetic acid.

The structures of the compounds of the invention were established by elementary analysis, by the modes of preparation and by ultraviolet, infrared and nuclear magnetic resonance spectra. The position of the $CH_2N=B$ group in Formula I was established by degradation studies on the compound where R is ethyl, $R^1$ is hydrogen, $R^2$ is methyl and N=B is dimethylamino. Treatment of the latter with Raney nickel in refluxing alcohol gave an indole derivative which must be 2,4-dimethyl-3-carbethoxy-5-hydroxyindole since it was different from the known 2,6 - dimethyl - 3 - carbethoxy - 5 - hydroxyindole. The NMR spectra were also characteristic of compounds where there are protons bearing a 1,2-relationship on a benzene ring. This indicates that the 6 and 7 positions, and not the 4 and 7 positions, are unsubstituted.

The compounds of the invention are basic in nature and thus form acid-addition salts when treated with moderate to strong inorganic or organic acids. Although pharmaceutically acceptable, water-soluble salts are preferred, all salts are useful as intermediates in the preparation of and as characterizing derivatives of the free bases. The acid-addition salts are the full equivalents of the corresponding free bases claimed herein insofar as the physiological properties inherent in the cation are concerned. Both the free bases and salt forms are considered to be one and the same invention.

Pharmacological testing of the compounds of the invention has demonstrated that they possess hypoglycemic and psychomotor depressant activities, thus indicating their usefulness as insulin substitutes for the treatment of diabetic conditions, and as sedatives or tranquillizers.

The compounds are prepared for use by dissolving a pharmaceutically acceptable salt form in sterile aqueous medium for parenteral administration; or by formulating a compound of the invention in tablet form with conventional excipients for oral administration.

The following examples will further illustrate the invention without the latter being limited thereby.

EXAMPLE 1

2-methyl-3-carbethoxy-4-(4-hydroxy-1-piperidylmethyl)-5-hydroxyindole

A solution of 5 g. (0.0228 mole) of 2-methyl-3- carbethoxy-5-hydroxyindole, 2.05 g. (0.0205 mole) of 4-hydroxypiperidine and 1.82 ml. (0.024 mole) of Formalin (395 mg. of formaldehyde per ml.) in 20 ml. of acetic acid and 5 ml. of water was heated on a steam bath for thirty minutes, then diluted with 200 ml. of water and filtered. The filtrate was made basic by addition of solid potassium carbonate and extracted with methylene chloride. The extracts were dried and concentrated to remove the solvents, affording 6.5 g. of 2-methyl-3-carbethoxy-4-(4 - hydroxy - 1 - piperidylmethyl) - 5 - hydroxyindole, M.P. 161–162.5° C. when recrystallized from ethyl acetate. Treatment of a sample of the free base with alcoholic hydrogen chloride afforded the hydrochloride salt form, M.P. 204–205° C. (dec.) after recrystallization from water.

EXAMPLE 2

2 - methyl - 3 - carbomethoxy - 4 - (4 - hydroxy - 1-piperidylmethyl)-5-hydroxyindole was prepared from 2-methyl - 3 - carbomethoxy - 5 - hydroxyindole, 4 - hydroxypiperidine and formaldehyde according to the procedure of Example 1. The product was obtained in the form of colorless needles, M.P. 189–190° C. (dec.) when recrystallized from 95% ethanol.

EXAMPLE 3

2 - methyl - 3 - carbobenzoxy - 4 - (4 - hydroxy - 1-piperidylmethyl) - 5 - hydroxyindole was prepared from 2 - methyl - 3 - carbobenzoxy - 5 - hydroxyindole, 4 - hydroxypiperidine and formaldehyde, and was obtained in the form of its hydrochloride salt, M.P. 211–213° C. (dec.) when recrystallized from ethanol.

The intermediate 2 - methyl - 3 - carbobenzoxy - 5-hydroxyindole, M.P. 205–207° C., was prepared by reacting p-benzoquinone and benzyl β-aminocrotonate.

EXAMPLE 4

2-methyl-4-(4-hydroxy-1-piperidylmethyl)-5-hydroxyindole-3-carboxylic acid

A solution of 3.92 g. of 2-methyl-3-carbobenzoxy-4-(4-hydroxy-1-piperidylmethyl) - 5 - hydroxyindole hydrochloride (Example 3) in 50 ml. of methanol was diluted to 225 ml. with absolute ethanol and cooled below room temperature. The solution was shaken with 0.50 g. of 10% palladium on carbon catalyst and hydrogen in a Parr apparatus. Reduction was complete in about one hour, and the mixture was filtered and concentrated to remove the solvent. The residue was suspended in ether, collected and dried to give 3.0 g. of 2-methyl-4-(4-hydroxy-1-piperidylmethyl)-5-hydroxyindole-3-carboxylic acid in the form of its hydrochloride salt, M.P. 171–172° C. (dec.), when recrystallized from methanol-ether.

EXAMPLE 5

1,2-dimethyl-3-carbethoxy-4-(4-hydroxy - 1 - piperidylmethyl)-5-hydroxyindole was prepared from 1,2-dimethyl-3-carbethoxy - 5 - hydroxyindole, 4-hydroxypiperidine and formaldehyde and was obtained in the form of colorless needles, M.P. 155.5–159° C. when recrystallized from ethanol; and also in the form of its acetic acid salt, colorless needles, M.P. 147–149° C. when recrystallized from isopropyl alcohol.

EXAMPLE 6

1-benzyl-2-methyl - 3 - carbethoxy - 4 - (4 - hydroxy-1-piperidylmethyl)-5-hydroxyindole was prepared from 1-benzyl-2-methyl-3-carbethoxy - 5 - hydroxyindole, 4-hydroxypiperidine and formaldehyde, and was obtained in the form of its hydrochloride salt, M.P. 200.5–201.5° C. (dec.) when recrystallized from methanol-ether.

EXAMPLE 7

2-ethyl-3-carbethoxy - 4 - (4 - hydroxy - 1 - piperidylmethyl)-5-hydroxyindole was prepared from 2-ethyl-3-carbethoxy - 5 - hydroxyindole, 4 - hydroxypiperidine and formaldehyde, and had the M.P. 148.5–150° C. when recrystallized from ethyl acetate.

EXAMPLE 8

3-carbethoxy-4-(4-hydroxy - 1 - piperidylmethyl)-5-hydroxyindole was prepared from 3-carbethoxy-5-hydroxyindole, 4-hydroxypiperidine and formaldehyde, and was obtained in the form of a pale yellow solid, M.P. 164–165° C. when recrystallized from ethyl acetate-hexane.

EXAMPLE 9

2 - methyl - 3-carbethoxy-4-(4-oxo-1-piperidylmethyl)-5-hydroxyindole was prepared from 2-methyl-3-carbethoxy-5-hydroxyindole, 4-piperidone and formaldehyde, and was obtained in the form of its hydrochloride salt, M.P. 202–204° C. (dec.) when recrystallized from acetic acid.

EXAMPLE 10

2-methyl-3-carbethoxy-4-(3β-hydroxy - 8 - nortropanylmethyl)-5-hydroxyindole was prepared from 2-methyl-3-carbethoxy-5-hydroxyindole, 3β - hydroxynortropane and formaldehyde, and was obtained in the form of its hydrochloride salt, M.P. 247–249° C. (dec.) when recrystallized from methanol-ether.

EXAMPLE 11

2-methyl-3-carbethoxy - 4 - (3α-hydroxy-8-nortropanylmethyl)-5-hydroxyindole was prepared from 2-methyl-3-carbethoxy-5-hydroxyindole, 3α - hydroxynortropane and formaldehyde, and was obtained in the form of its hydrochloride salt, colorless needles, M.P. 197.5–199° C. (dec.) when recrystallized from 95% ethanol.

EXAMPLE 12

2-methyl-3-carbethoxy - 4 - (4-methyl - 1 - piperazinyl-methyl)-5-hydroxyindole was prepared from 2-methyl-3-carbethoxy - 5 - hydroxyindole, N - methylpiperazine and formaldehyde, and had the M.P. 99–111° C. when recrystallized from benzene. An acetone solution of the free base was treated with an acetone solution of p-toluene-sulfonic acid. The salt which separated was recrystallized from methanol-ether to give 2-methyl-3-carbethoxy-4-(4-methyl-1-piperazinylmethyl)-5-hydroxyindole in the form of its p-toluene-sulfonate salt, colorless plates, M.P. 197–201° C.

By replacing the N-methylpiperazine in the foregoing preparation by N-butylpiperazine, there can be obtained 2-methyl-3-carbethoxy-4-(4 - butyl-1-piperazinylmethyl)-5-hydroxyindole.

Similarly, 1 - benzyl-2-mehtyl-3-carboisopropoxy-5-hydroxyindole, 1-benzyl-2-methyl-3-carbohexoxy-5-hydroxyindole, 1-benzyl-2-butyl-3-carbethoxy-5-hydroxyindole, 1-isopropyl-2-methyl-3-carbethoxy-5-hydroxyindole, 1 - (3-phenylpropyl)-2-methyl-3-carbethoxy-5-hydroxyindole or 1-(4-phenylbutyl)-2-methyl-3-carbethoxy - 5 - hydroxyindole can be caused to react with 4-hydroxypiperidine and formaldehyde to give, respectively, 1-benzyl-2-methyl-3-carboisopropoxy-4-(4-hydroxy - 1 - piperidyl-methyl)-5-hydroxyindole, 1-benzyl - 2 - methyl-3-carbohexoxy-4-(4-hydroxy-1-piperidylmethyl)-5-hydroxyindole, 1-benzyl-2-butyl-3-carbethoxy-4-(4-hydroxy - 1 - piperidylmethyl)-5-hydroxyindole, 1-isopropyl - 2 - methyl-3-carbethoxy-4-(4-hydroxy-1-piperidyl-methyl) - 5 - hydroxyindole, 1 - (3-phenylpropyl)-2-methyl-3-carbethoxy - 4 - (4-hydroxy-1-piperidylmethyl) - 5 - hydroxyindole, or 1 - (4 - phenylbutyl)-2-methyl - 3-carbethoxy-4-(4-hydroxy-1-piperidylmethyl)-5-hydroxyindole.

I claim:
1. A compound of the formula

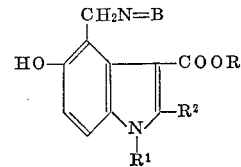

wherein N=B is 4-hydroxy-1-piperidyl, 4-oxo-1-piperidyl, 4-oxo-1-piperidyl,3-hydroxy-8-nortropanyl or 4-lower-alkyl-1-piperazinyl; R and $R^1$ are hydrogen, lower-alkyl or phenyl-lower-alkyl; and $R^2$ is hydrogen or lower-alkyl.

2. A compound according to claim 1 wherein N=B is 4-hydroxy-1-piperidyl.

3. 2-methyl - 3 - carbethoxy-4-(4-hydroxy-1-piperidylmethyl)-5-hydroxyindole, according to claim 2 wherein R is ethyl, $R_1$ is hydrogen and $R_2$ is methyl.

4. 2-methyl-3-carbomethoxy-4-(4-hydroxy - 1 - piperidylmethyl)-5-hydroxyindole, according to claim 2 wherein R and $R^2$ are methyl and $R^1$ is hydrogen.

5. 2-methyl-3-carbobenzoxy-4-(4-hydroxy - 1 - piperidylmethyl)-5-hydroxyindole, according to claim 2 wherein R is benzyl, $R^1$ is hydrogen and $R^2$ is methyl.

6. 2-methyl-4-(-hydroxy - 1 - piperidylmethyl)-5-hydroxyindole-3-carboxylic acid, according to claim 2 wherein R and $R^1$ are hydrogen and $R^2$ is methyl.

7. 1,2-dimethyl-3-carbethoxy-4-(4-hydroxy - 1 - piperidylmethyl)-5-hydroxyindole, according to claim 2 wherein R is ethyl and $R^1$ and $R^2$ are methyl.

8. 1-benzyl-2-methyl - 3 - carbethoxy-4-(4-hydroxy-1-piperidylmethyl)-5-hydroxyindole, according to claim 2 wherein R is ethyl, $R^1$ is benzyl and $R^2$ is methyl.

9. 2-ethyl-3-carbethoxy-4-(4-hydroxy - 1 - piperidylmethyl)-5-hydroxyindole, according to claim 2 wherein R and $R^2$ are ethyl and $R^1$ is hydrogen.

10. 3-carbethoxy-4-(4-hydroxy - 1 - piperidylmethyl)-5-hydroxyindole, according to claim 2 wherein R is ethyl and $R^1$ and $R^2$ are hydrogen.

11. A compound according to claim 1 wherein N=B is 4-oxo-1-piperidyl.

12. 2 - methyl-3-carbethoxy-4-(4-oxo-1-piperidylmethyl)-5-hydroxyindole, according to claim 11 wherein R is ethyl, $R^1$ is hydrogen and $R^2$ is methyl.

13. A compound according to claim 1 wherein N=B is 3-hydroxy-8-nortropanyl.

14. 2-methyl-3-carbethoxy-4-(3-hydroxy-8-nortropanylmethyl)-5-hydroxyindole, according to claim 13 wherein R is ethyl, $R^1$ is hydrogen and $R^2$ is methyl.

15. A compound according to claim 1 wherein N=B is 4-lower-alkyl-1-piperazinyl.

16. 2-methyl-3-carbethoxy-4-(4-methyl-1-piperazinylmethyl)-5-hydroxyindole, according to claim 15 wherein N=B is 4-methyl-1-piperazinyl, R is ethyl, $R^1$ is hydrogen and $R^2$ is methyl.

References Cited
UNITED STATES PATENTS 2,852,527   9/1958   Steck _____ 260—319

HENRY R. JILES, Primary Examiner

G. T. TODD, Assistant Examiner

U.S. Cl. X.R.

260—292, 294, 294.3, 326.13